United States Patent
Lu

(10) Patent No.: US 11,223,579 B2
(45) Date of Patent: Jan. 11, 2022

(54) DATA PROCESSING METHOD, NETWORK INTERFACE CARD, AND SERVER

(71) Applicant: HUAWEI TECHNOLOGIES CO., LTD., Guangdong (CN)

(72) Inventor: Shengwen Lu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 16/728,180

(22) Filed: Dec. 27, 2019

(65) Prior Publication Data

US 2020/0136998 A1 Apr. 30, 2020

Related U.S. Application Data

(63) Continuation of application No. PCT/CN2017/091278, filed on Jun. 30, 2017.

(51) Int. Cl.
| | | |
|---|---|---|
| *H04W 36/36* | (2009.01) | |
| *H04L 12/861* | (2013.01) | |
| *G06F 9/455* | (2018.01) | |
| *H04L 12/721* | (2013.01) | |
| *H04L 12/931* | (2013.01) | |
| *H04L 29/06* | (2006.01) | |

(52) U.S. Cl.
CPC ...... *H04L 49/9068* (2013.01); *G06F 9/45533* (2013.01); *H04L 45/38* (2013.01); *H04L 49/70* (2013.01); *H04L 63/0245* (2013.01)

(58) Field of Classification Search
None
See application file for complete search history.

(56) References Cited

U.S. PATENT DOCUMENTS

| | | | |
|---|---|---|---|
| 10,333,897 B2 | 6/2019 | Arramreddy et al. | |
| 2011/0320632 A1 | 12/2011 | Karino | |
| 2013/0254766 A1* | 9/2013 | Zuo ........................ | H04L 49/70 718/1 |
| 2015/0146718 A1* | 5/2015 | Wang ..................... | H04L 45/70 370/389 |
| 2015/0381494 A1* | 12/2015 | Cherian ................ | H04L 45/745 370/392 |
| 2016/0119256 A1* | 4/2016 | Wang ..................... | H04L 49/70 370/401 |

(Continued)

FOREIGN PATENT DOCUMENTS

| | | |
|---|---|---|
| CN | 103401797 A | 11/2013 |
| CN | 103916314 A | 7/2014 |

(Continued)

*Primary Examiner* — Sithu Ko
(74) *Attorney, Agent, or Firm* — Huawei Technologies Co., Ltd.

(57) ABSTRACT

In a data center, a network interface card is utilized to assist processing of data packets. The server comprising a host and the network interface card connected to the host. The host is configured to generate processing information when receiving data packet from the network interface card, and send the processing information to the network interface card. The network interface card is configured to generate an action field and a match field of a session entry to process the data packet, based on the processing information sent by the host and the matching information of the data packet.

15 Claims, 7 Drawing Sheets

(56) References Cited

U.S. PATENT DOCUMENTS

| | | | | |
|---|---|---|---|---|
| 2016/0142301 | A1* | 5/2016 | Anand | H04L 49/70 |
| | | | | 370/389 |
| 2016/0226768 | A1* | 8/2016 | Liu | H04L 45/64 |
| 2016/0232019 | A1* | 8/2016 | Shah | G06F 9/45558 |
| 2016/0308759 | A1* | 10/2016 | Feng | H04L 45/745 |
| 2017/0118173 | A1* | 4/2017 | Arramreddy | H04L 63/20 |
| 2018/0048593 | A1* | 2/2018 | Tian | H04L 41/0813 |
| 2018/0212869 | A1* | 7/2018 | Wu | H04L 45/38 |
| 2018/0219770 | A1 | 8/2018 | Wu et al. | |

FOREIGN PATENT DOCUMENTS

| | | |
|---|---|---|
| CN | 104205080 A | 12/2014 |
| CN | 104394080 A | 3/2015 |
| CN | 104426816 A | 3/2015 |
| CN | 104883302 A | 9/2015 |
| CN | 105245456 A | 1/2016 |
| CN | 105939291 A | 9/2016 |
| CN | 106302225 A | 1/2017 |
| CN | 106533942 A | 3/2017 |
| CN | 106815067 A | 6/2017 |
| JP | 2015515798 A | 5/2015 |
| WO | 2011068091 A1 | 6/2011 |
| WO | 2018023499 A1 | 2/2018 |

* cited by examiner

DATA PROCESSING METHOD, NETWORK INTERFACE CARD, AND SERVER

CROSS-REFERENCE TO RELATED APPLICATION

This application is a continuation of International Patent Application No. PCT/CN2017/091278, filed on Jun. 30, 2017, which is hereby incorporated by reference in its entirety.

TECHNICAL FIELD

This application relates to the computer field, and in particular, to a method, a network interface card (NIC), and a server for offloading a function of processing data packets to the network interface card.

BACKGROUND

In a cloud computing environment, services need to be provided for a relatively large number of users, and there is usually many servers in a data center used to provide a cloud service. A plurality of virtual machines (VM) run on each server. A virtual machine tenanted by a tenant needs to be capable of communicating with the outside, and is isolated from another virtual machine. A virtual machine communicates, by using a virtual switch (VS), with another virtual machine on a same server or a virtual machine running on another server. Currently, a common virtual switch includes an open vSwitch (OVS). A software-defined networking (SDN) controller usually controls each virtual switch by using a flow table defined in the OpenFlow protocol.

Hardware resources on each server are required to support running of a plurality of VMs, a virtual switch, and a virtual machine monitor (VMM). The virtual machine monitor is also referred to as a virtual machine manager or hypervisor. The hardware resources on each server are limited, however. If the virtual switch that performs a data exchange task occupies excessive hardware resources, running of the VMs on the server is easily affected, and work efficiency is reduced.

SUMMARY

In view of this, this application discloses a data processing method, a network interface card, and a server. Action fields of one session entry are generated according to action fields of a plurality of flow entries associated with a data packet, and a function of processing the data packet is offloaded to the network interface card for implementation. The session entry is generated and maintained by the network interface card and matches received data packets.

According to a first aspect, this application provides a server for data processing, where the server includes a host and a network interface card, and a virtual machine and a virtual switch run on the host. The network interface card is connected to the host by using a host interface, and is connected to an external network by using a network interface. The host is configured to: receive a first data packet sent by the network interface card, and obtain, according to matching information carried in the first data packet, at least two flow entries associated with the first data packet. The host is further configured to: generate processing information according to the at least two flow entries, and send the processing information to the network interface card by using the host interface, where the processing information is used to indicate a processing operation performed by the virtual switch on the first data packet according to the at least two flow entries. The network interface card is configured to: generate an action field of a first session entry according to the processing information, and generate a match field of the first session entry according to the matching information of the first data packet, where the first session entry is used to record a rule used by the network interface card to process a data packet that matches the first session entry.

The first data packet may be a data packet received by the network interface card from the virtual machine by using the host interface or a data packet received from the external network by using the network interface.

The server generates action fields of one session entry according to action fields of the at least two flow entries associated with the data packet, and offloads a function of processing the data packet to the network interface card for implementation, so that hardware resources on the host are saved.

According to the first aspect, in a first possible implementation of the first aspect, the network interface card is further configured to: receive a second data packet; query, according to the matching information, the first session entry that matches the second data packet; and process the second data packet according to the action field of the first session entry. The second data packet and the first data packet belong to a same data flow, and include same matching information.

The network interface card can implement a processing operation on the data packet provided that the network interface card queries one session entry that matches the data packet, so that a data packet processing procedure is simplified.

According to the first aspect or the first possible implementation of the first aspect, in a second possible implementation of the first aspect, before the host receives the first data packet sent by the network interface card, the network interface card is further configured to: receive the first data packet, query a recorded session entry according to the matching information, and send the first data packet to the host when finding no session entry that matches the first data packet.

The network interface card maintains a session table. Different data flows have different matching information, and different data flows may be processed in different manners. Each session entry is corresponding to one data flow. After receiving the data packet, the network interface card queries the session table according to the matching information carried in the data packet. If the session entry that matches the data packet is found, the data packet is processed according to information recorded in the action field of the session entry. If no session entry corresponding to the data packet is found, the first data packet is a first data packet of the data flow in which the first data packet is located, or the first data packet is not a first data packet of the data flow, but a session entry corresponding to the data flow is deleted from the session table, and the network interface card reports the first data packet to the virtual switch running on the host for processing.

According to any one of the first aspect or the foregoing possible implementations of the first aspect, in a third possible implementation of the first aspect, the network interface card is further configured to: query a security group rule that matches the first data packet, and write the security group rule into the action field of the first session entry.

The security group rule is used to implement a security filtering rule. The security group rule is also offloaded to the network interface card. The network interface card may perform a plurality of processing operations on a matched data packet according to the first session entry, so that a data packet processing procedure is simplified.

According to the third possible implementation of the first aspect, in a fourth possible implementation of the first aspect, a security group function is configured for the host; and the host is further configured to: query the security group rule that matches the first data packet; and send, to the network interface card, the security group rule that matches the first data packet.

If the security group rule is configured in the host, the host may query the security group rule of the first data packet according to the matching information of the first data packet, and transmit the security group rule of the first data packet to the network interface card by using the host interface.

According to the third or the fourth possible implementation of the first aspect, in a fifth possible implementation of the first aspect, if the security group rule includes a firewall rule that allows a forward data packet and a reverse data packet to pass, the network interface card is further configured to: create a second session entry, and generate a match field of the second session entry according to the matching information of the first data packet, where the second session entry is a session entry that matches a reverse data flow of the first data packet.

An action field of the second session entry may be set to uploading to the host or set to null. Subsequently, the action field of the second session entry is updated according to actual processing performed by the virtual switch on the reverse data packet. Alternatively, the first session entry and the second session entry may be combined into one record. The action field is classified into two fields: a forward field and a reverse field. For example, a direction in which a VM sends a data packet may be set to be a forward direction, and a direction in which a data packet is from a network side may be set to be a reverse direction. Source node information and destination node information are exchanged when a reverse table is queried.

According to any one of the first aspect or the foregoing possible implementations of the first aspect, in a sixth possible implementation of the first aspect, the host is further configured to send a modification instruction to the network interface card after modifying one of the at least two flow entries, where the modification instruction is used to indicate a modification operation performed by the host on one of the at least two flow entries; and the network interface card is further configured to modify the first session entry according to the modification instruction.

The server may link a session entry to a flow entry of the virtual switch according to a linked-list technology. When an entry of the virtual switch is deleted or modified, the host instructs the network interface card to synchronously delete or modify a session table.

According to any one of the first aspect or the foregoing possible implementations of the first aspect, in a seventh possible implementation of the first aspect, the network interface card is further configured to delete the first session entry if the first session entry is not accessed within a preset time period.

Because storage space of the network interface card is limited, or storage space allocated to the session table is limited, when a session entry is not accessed for a long time, an aging mechanism is enabled, that is, a session entry that is not accessed for a time period is deleted, so as to save storage space.

According to the seventh possible implementation of the first aspect, in an eighth possible implementation of the first aspect, after deleting the first session entry, the network interface card is further configured to send a deletion instruction to the host; and the host is further configured to delete the at least two flow entries according to the deletion instruction.

According to a flow table aging mechanism, a flow entry that is not accessed for a long time is automatically aged. After the flow entry is aged, a session entry is deleted. In this case, a session entry needs to be continuously re-created and deleted. The host may set aging of a flow table, may set an extremely long aging time or set the flow table not to be aged. After a session entry is aged (that is, is deleted), the host may be instructed to age a flow entry corresponding to the session entry.

According to a second aspect, this application provides a data processing method. A server includes a host on which a virtual switch runs and a network interface card, and the method includes: receiving, by the host, a first data packet sent by the network interface card, obtaining at least two flow entries associated with the first data packet, generating processing information according to the at least two flow entries, and sending the processing information to the network interface card; and generating, by the network interface card, an action field of a first session entry according to the processing information, and generating a match field of the first session entry according to matching information of the first data packet, where the first session entry is used to record a rule used by the network interface card to process a data packet that matches the first session entry.

According to the second aspect, in a first possible implementation of the second aspect, the method further includes: receiving, by the network interface card, a second data packet, where the second data packet includes same matching information as the first data packet; and querying, by the network interface card according to the matching information, the first session entry that matches the second data packet, and processing the second data packet according to the action field of the first session entry.

According to the second aspect or the first possible implementation of the second aspect, in a second possible implementation of the second aspect, before the host receives the first data packet sent by the network interface card, the method further includes: receiving, by the network interface card, the first data packet, querying a recorded session entry according to the matching information, and sending the first data packet to the host when finding no session entry that matches the first data packet.

According to any one of the second aspect or the foregoing possible implementations of the second aspect, in a third possible implementation of the second aspect, the method further includes: querying, by the network interface card, a security group rule that matches the first data packet, and writing the security group rule into the action field of the first session entry.

According to the third possible implementation of the second aspect, in a fourth possible implementation of the second aspect, a security group function is configured for the host; and the method further includes: querying, by the host, the security group rule that matches the first data packet, and sending, to the network interface card, the security group rule that matches the first data packet.

According to the third or the fourth possible implementation of the second aspect, in a fifth possible implementation of the second aspect, if the security group rule includes a firewall rule that allows a forward data packet and a reverse data packet to pass, the method further includes: creating, by the network interface card, a second session entry, and generating a match field of the second session entry according to the matching information of the first data packet, where the second session entry is a session entry that matches a reverse data flow of the first data packet.

According to any one of the second aspect or the foregoing possible implementations of the second aspect, in a sixth possible implementation of the second aspect, the method further includes: sending, by the host, a modification instruction to the network interface card after modifying one of the at least two flow entries, where the modification instruction is used to indicate a modification operation performed by the host on one of the at least two flow entries; and modifying, by the network interface card, the first session entry according to the modification instruction.

According to any one of the second aspect or the foregoing possible implementations of the second aspect, in a seventh possible implementation of the second aspect, the method further includes: deleting, by the network interface card, the first session entry if the first session entry is not accessed within a preset time period.

According to the seventh possible implementation of the second aspect, in an eighth possible implementation of the second aspect, after the network interface card deletes the first session entry, the method further includes: sending, by the network interface card, a deletion instruction to the host; and deleting, by the host, the at least two flow entries according to the deletion instruction.

Any one of the second aspect or the possible implementations of the second aspect is the method corresponding to any one of the first aspect or the possible server implementations of the first aspect. A description in any one of the first aspect or the possible implementations of the first aspect is correspondingly applicable to any one of the second aspect or the possible implementations of the second aspect. Details are not described herein again.

According to a third aspect, the present invention provides a data processing method, and the method includes: sending, by a network interface card, a first data packet to a host; receiving, by the network interface card, processing information from the host, where the processing information is used to indicate a processing operation performed by the host on the first data packet according to at least two flow entries that match the first data packet; and generating, by the network interface card, an action field of a first session entry according to the processing information, and generating a match field of the first session entry according to matching information of the first data packet, where the first session entry is used to record a rule used by the network interface card to process a data packet that matches the first session entry.

According to the third aspect, in a first possible implementation of the third aspect, the method further includes: receiving, by the network interface card, a second data packet, where the second data packet includes same matching information as the first data packet; and querying, by the network interface card according to the matching information, the first session entry that matches the second data packet, and processing the second data packet according to the action field of the first session entry.

According to the third aspect or the first possible implementation of the third aspect, in a second possible implementation of the third aspect, the method includes: receiving, by the network interface card, the first data packet, querying a recorded session entry according to the matching information, and sending the first data packet to the host when finding no session entry that matches the first data packet.

According to any one of the third aspect or the foregoing possible implementations of the third aspect, in a third possible implementation of the third aspect, the method further includes: querying, by the network interface card, a security group rule that matches the first data packet, and writing the security group rule into the action field of the first session entry.

According to the third possible implementation of the third aspect, in a fourth possible implementation of the third aspect, if the security group rule includes a firewall rule that allows a forward data packet and a reverse data packet to pass, the method further includes: creating, by the network interface card, a second session entry, and generating a match field of the second session entry according to the matching information of the first data packet, where the second session entry is a session entry that matches a reverse data flow of the first data packet.

According to any one of the third aspect or the foregoing possible implementations of the third aspect, in a fifth possible implementation of the third aspect, the method further includes: receiving, by the network interface card, a modification instruction from the host, where the modification instruction is used to indicate a modification operation performed by the host on one of the at least two flow entries; and modifying, by the network interface card, the first session entry according to the modification instruction.

According to any one of the third aspect or the foregoing possible implementations of the third aspect, in a sixth possible implementation of the third aspect, the method further includes: deleting, by the network interface card, the first session entry if the first session entry is not accessed within a preset time period.

According to the sixth possible implementation of the third aspect, in a seventh possible implementation of the third aspect, after the network interface card deletes the first session entry, the method further includes: sending, by the network interface card, a deletion instruction to the host, where the deletion instruction is used to instruct the host to delete the at least two flow entries.

Any one of the third aspect or the possible implementations of the third aspect is the network interface card side method corresponding to any one of the first aspect or the possible server implementations of the first aspect. A description in any one of the first aspect or the possible implementations of the first aspect is correspondingly applicable to any one of the third aspect or the possible implementations of the third aspect. Details are not described herein again.

According to a fourth aspect, the present invention provides a network interface card, and the network interface card includes: a sending unit, configured to send a first data packet to a host; a receiving unit, configured to receive processing information from the host, where the processing information is used to indicate a processing operation performed by the host on the first data packet according to at least two flow entries that match the first data packet; and a processing unit, configured to: generate an action field of a first session entry according to the processing information, and generate a match field of the first session entry according to matching information of the first data packet, where the first session entry is used to record a rule used by the network interface card to process a data packet that matches the first session entry.

According to the fourth aspect, in a first possible implementation of the fourth aspect, the receiving unit is further configured to receive a second data packet, where the second data packet includes same matching information as the first data packet; and the processing unit is further configured to: query, according to the matching information, the first session entry that matches the second data packet, and process the second data packet according to the action field of the first session entry.

According to the fourth aspect or the first possible implementation of the fourth aspect, in a second possible implementation of the fourth aspect, before the sending unit sends the first data packet to the host, the receiving unit is further configured to receive the first data packet, the processing unit is further configured to query a recorded session entry according to the matching information, and the sending unit is further configured to send the first data packet to the host when the processing unit finds no session entry that matches the first data packet.

According to any one of the fourth aspect or the foregoing possible implementations of the fourth aspect, in a third possible implementation of the fourth aspect, the processing unit is further configured to: query a security group rule that matches the first data packet, and write the security group rule into the action field of the first session entry.

According to the third possible implementation of the fourth aspect, in a fourth possible implementation of the fourth aspect, if the security group rule includes a firewall rule that allows a forward data packet and a reverse data packet to pass, the processing unit is further configured to: create a second session entry, and generate a match field of the second session entry according to the matching information of the first data packet, where the second session entry is a session entry that matches a reverse data flow of the first data packet.

According to any one of the fourth aspect or the foregoing possible implementations of the fourth aspect, in a fifth possible implementation of the fourth aspect, the receiving unit is further configured to receive a modification instruction from the host, where the modification instruction is used to indicate a modification operation performed by the host on one of the at least two flow entries; and the processing unit is further configured to modify the first session entry according to the modification instruction.

According to any one of the fourth aspect or the foregoing possible implementations of the fourth aspect, in a sixth possible implementation of the fourth aspect, the processing unit is further configured to delete the first session entry if the first session entry is not accessed within a preset time period.

According to the sixth possible implementation of the fourth aspect, in a seventh possible implementation of the fourth aspect, after deleting the first session entry, the processing unit is further configured to send a deletion instruction to the host, where the deletion instruction is used to instruct the host to delete the at least two flow entries.

Any one of the fourth aspect or the possible implementations of the fourth aspect is the network interface card corresponding to any one of the first aspect or the possible server implementations of the first aspect. A description in any one of the first aspect or the possible implementations of the first aspect is correspondingly applicable to any one of the fourth aspect or the possible implementations of the fourth aspect. Details are not described herein again.

According to a fifth aspect, the present invention provides a network interface card, including a host interface, a processor, and a memory, where the host interface is configured to connect to the host; the processor is configured to send a first data packet to the host by using the host interface; the host interface is further configured to receive processing information from the host by using the host interface, where the processing information is used to indicate a processing operation performed by the host on the first data packet according to at least two flow entries that match the first data packet; the processor is further configured to: generate an action field of a first session entry according to the processing information, and generate a match field of the first session entry according to matching information of the first data packet, where the first session entry is used to record a rule used by the network interface card to process a data packet that matches the first session entry; and the memory is configured to store the first session entry.

According to the fifth aspect, in a first possible implementation of the fifth aspect, the network interface card further includes a network interface, and the network interface is configured to connect to an external network; the processor is further configured to receive a second data packet by using the host interface or the network interface, where the second data packet includes same matching information as the first data packet; and the processor is further configured to: query, according to the matching information, the first session entry that matches the second data packet, and process the second data packet according to the action field of the first session entry.

According to the fifth aspect or the first possible implementation of the fifth aspect, in a second possible implementation of the fifth aspect, the network interface card further includes the network interface, and the network interface is configured to connect to the external network; and before sending the first data packet to the host by using the host interface, the processor is further configured to: receive the first data packet by using the host interface or the network interface, query a recorded session entry according to the matching information, and send the first data packet to the host when finding no session entry that matches the first data packet.

According to any one of the fifth aspect or the foregoing possible implementations of the fifth aspect, in a third possible implementation of the fifth aspect, the processor is further configured to: query a security group rule that matches the first data packet, and write the security group rule into the action field of the first session entry.

According to the third possible implementation of the fifth aspect, in a fourth possible implementation of the fifth aspect, if the security group rule includes a firewall rule that allows a forward data packet and a reverse data packet to pass, the processor is further configured to: create a second session entry, and generate a match field of the second session entry according to the matching information of the first data packet, where the second session entry is a session entry that matches a reverse data flow of the first data packet.

According to any one of the fifth aspect or the foregoing possible implementations of the fifth aspect, in a fifth possible implementation of the fifth aspect, the processor is further configured to receive a modification instruction from the host by using the host interface, where the modification instruction is used to indicate a modification operation performed by the host on one of the at least two flow entries; and the processor is further configured to modify the first session entry according to the modification instruction.

According to any one of the fifth aspect or the foregoing possible implementations of the fifth aspect, in a sixth possible implementation of the fifth aspect, the processor is further configured to delete the first session entry if the first session entry is not accessed within a preset time period.

According to the sixth possible implementation of the fifth aspect, in a seventh possible implementation of the fifth aspect, after deleting the first session entry, the processor is further configured to send a deletion instruction to the host by using the host interface, where the deletion instruction is used to instruct the host to delete the at least two flow entries.

Any one of the fifth aspect or the possible implementations of the fifth aspect is the network interface card corresponding to any one of the first aspect or the possible server implementations of the first aspect. A description in any one of the first aspect or the possible implementations of the first aspect is correspondingly applicable to any one of the fifth aspect or the possible implementations of the fifth aspect. Details are not described herein again.

According to the technical solutions disclosed in this application, a part of running pressure during the data packet processing is transferred to the network interface card, and as a hardware device, the network interface card not only has high processing efficiency, but also does not need to occupy other resources at a hardware layer during running. In addition, in this application, the processing information of data processing performed by the virtual switch according to the plurality of flow entries is recorded in one session entry, so that the network interface card can process the matched data packet by using only one session entry, thereby simplifying the processing procedure.

DESCRIPTION OF EMBODIMENTS

Figure 1:
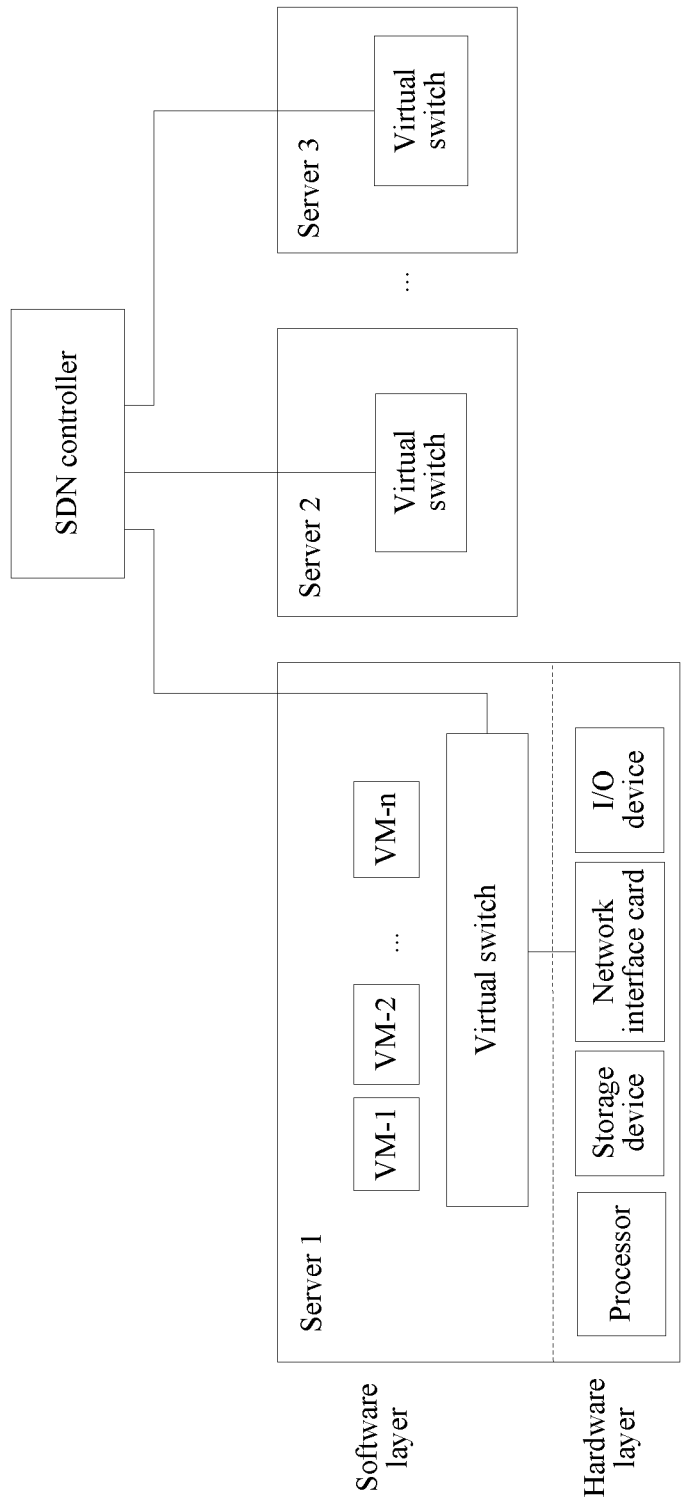
FIG. 1 is a schematic diagram of an architecture of a data center.

The following describes the embodiments of the present invention with reference to the accompanying drawings.

In the embodiments of the present invention, terms such as "first" and "second" are used to distinguish between objects, such as a first data packet and a second data packet, but there is no logical or time-sequential dependency between the "first" and the "second".

In the embodiments of the present invention, a data packet comprises of matching information and a payload (payload). The matching information is used to match a match field of a flow table entry or that of a session table entry.

In the embodiments of the present invention, a network interface card, a processor, an input/output device, and a storage device are disposed at a hardware layer on a server. A part other than the network interface card on the server is referred to as a host.

In the embodiments of the present invention, a virtual switch is a switching device running on the host of the server and that is implemented by using software, and is usually used in an SDN. A common virtual switch includes an OVS.

In the embodiments of the present invention, a flow table is used to control a data flow in the SDN, and may also be referred to as an SDN flow table. Specifically, a flow table that complies with the OpenFlow protocol or a flow table that complies with another protocol may be used. A flow entry of a flow table includes a match field and an action field. The match field is used to match a data packet. The action field is used to instruct the virtual switch to process the data packet according to a match result. The action field may include processing information of a matched data packet, for example, forwarding the matched data packet, discarding the matched data packet, or sending the matched data packet to an SDN controller; and may further include routing information of the data packet, for example, a destination port identifier of the data packet. In the embodiments of the present invention, the action field of the flow table entry may include any action supported in the OpenFlow protocol. This is not limited in the present invention.

In the embodiments of the present invention, a flow table set that can be accessed by the virtual switch includes at least two flow tables, and the virtual switch processes a data packet by using the flow tables in the flow table set. Specifically, one data packet may be associated with a plurality of flow entries in a plurality of flow tables. After receiving a data packet sent by the network interface card, the virtual switch may query a plurality of flow entries associated with the data packet, and process the data packet sequentially according to the plurality of flow entries.

In the embodiments of the present invention, a session table is used by the network interface card (NIC) to control a data flow. A session entry of the session table includes a match field and an action field. The match field is used to match a data packet. The action field is used to instruct the network interface card to process a matched data packet. Action fields of the session entry are generated according to action fields of a plurality of flow entries associated with the data packet.

In the embodiments of the present invention, the flow table set is usually stored in the storage device on the server; and the session table may be stored in the storage device on the server, or may be stored in a storage device inside the network interface card. If both the flow table set and the session table are stored in the storage device on the server, the server opens storage space for each of the flow table set and the session table in the storage device on the server. In the embodiments of the present invention, an example in which the session table is stored in the network interface card is used for description. Persons skilled in the art may directly derive a case in which the session table is stored in the storage device on the server.

In the embodiments of the present invention, a data flow indicates a series of data packets that carry same matching information. Specifically, all matching information of data packets in a same data flow may match a match field of a flow entry corresponding to the data flow or a match field of a session entry corresponding to the data flow.

In the embodiments of the present invention, for example, an SR-IOV (single-root I/O virtualization) technology for directly connecting a network interface card and a VM is used. In actual use, alternatively, another technology that supports directly connecting a network interface card and a VM may be used.

In the embodiments of the present invention, a flow entry associated with a data packet is a flow entry that needs to be used in a procedure in which the virtual switch processes the data packet. The flow entry may be specifically a forwarding flow entry of an OVS. For example, the virtual switch first queries, according to matching information of a data packet 1, a flow table 1 for a flow entry 1 that matches the data packet 1, and performs a processing operation on the data packet 1 according to information recorded in an action field of the flow entry 1, to obtain a data packet 2; and then queries, according to matching information of the data packet 2, a flow table 2 for a flow entry 2 that matches the data packet 2, and performs a processing operation on the data packet 2 according to information recorded in an action field of the flow entry 2. In this case, both the flow entry 1 and the flow entry 2 are flow entries associated with the data packet 1. If the virtual switch performs a modification operation on the data packet 1 according to the information recorded in the action field of the flow entry 1, the data packet 2 is different from the data packet 1. If the virtual switch performs no modification operation on the data packet 1 according to the flow entry 1, the data packet 2 is the same as the data packet 1.

Hardware resources on each server in a data center are required to support running of a plurality of virtual machines, a virtual switch, and a virtual machine monitor. The hardware resources on each server are limited. If the virtual switch that performs a data exchange task occupies excessive hardware resources, running of the virtual machines on the server is easily affected, and work efficiency is reduced. To alleviate load of hardware on the server, a service on the virtual switch may be offloaded to a network interface card for implementation.

In the OpenFlow protocol, a virtual switch has extremely flexible functions. Different processing operations on a data packet are recorded in different flow entries. The virtual switch maintains a plurality of flow entries associated with the data packet. It is difficult for hardware to implement large-scale flow tables that support mask matching, and searching of a plurality of flow tables affects performance. Therefore, if a service on the virtual switch is directly offloaded to a network interface card, for example, a flow table of the virtual switch is directly copied to the network interface card, a large quantity of flow tables may cause excessive load of the network interface card. Consequently, optimization cannot be achieved.

In the embodiments of the present invention, action fields of a plurality of flow entries associated with a data packet are combined into action fields of one session entry, and a function of processing the data packet is offloaded to the network interface card for implementation. The network interface card can implement a processing operation on the data packet provided that the network interface card queries one session entry that matches the data packet, so that hardware resources on the server are saved, and a data packet processing procedure is simplified.

FIG. 1 is a schematic diagram of an SDN architecture according to an embodiment of the present invention. For example, a centralized SDN controller is used in FIG. 1. In practice, alternatively, an SDN controller may be deployed in each server in a distributed manner.

When each host runs, a hardware layer of the host supports running of a virtual switch and a plurality of virtual machines at a software layer. In each server, a host establishes a communication connection to a network interface card. The host communicates with an external network by using the network interface card. For example, the network interface card first obtains a data packet from the external network, and then sends the data packet to a VM running on the host. A data packet sent by the VM running on the host to the external network is sent to the network interface card, and is sent to the external network by using the network interface card.

The following uses a server 200 and a server 300 as examples to show impact on a data processing procedure when a function of the virtual switch is offloaded to the network interface card and when the function of the virtual switch is not offloaded to the network interface.

Figure 2:
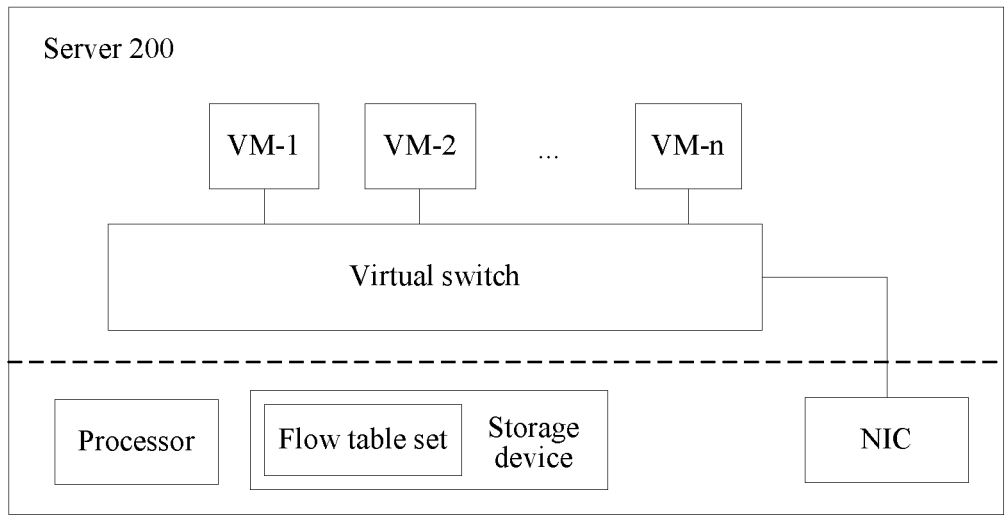
FIG. 2 is a schematic diagram of an organizational structure of a server.

As shown in FIG. 2, if a function of a virtual switch is not offloaded to a network interface card, after receiving a data packet from an external network, if a destination of the data packet is determined belonging to the server 200, the network interface card in the server 200 sends the data packet to the virtual switch. In this case, the virtual switch matches the data packet with a flow table in a flow table set; and processes the data packet according to an indication of a matched flow entry, and then sends the processed packet data to a destination VM connected to the virtual switch.

It can be learned from the foregoing data packet processing procedure that main running pressure in the data processing process is concentrated on the virtual switch. Running of the virtual switch depends on resources at a hardware layer on the server. More processor and storage device resources occupied by the virtual switch lead to fewer resources on the server that can be used by the VM for running. However, if an upper limit to resources, at the hardware layer, that can be occupied by the virtual switch is specified, it is difficult to ensure performance of the virtual switch as data packet traffic increases.

Figure 3:
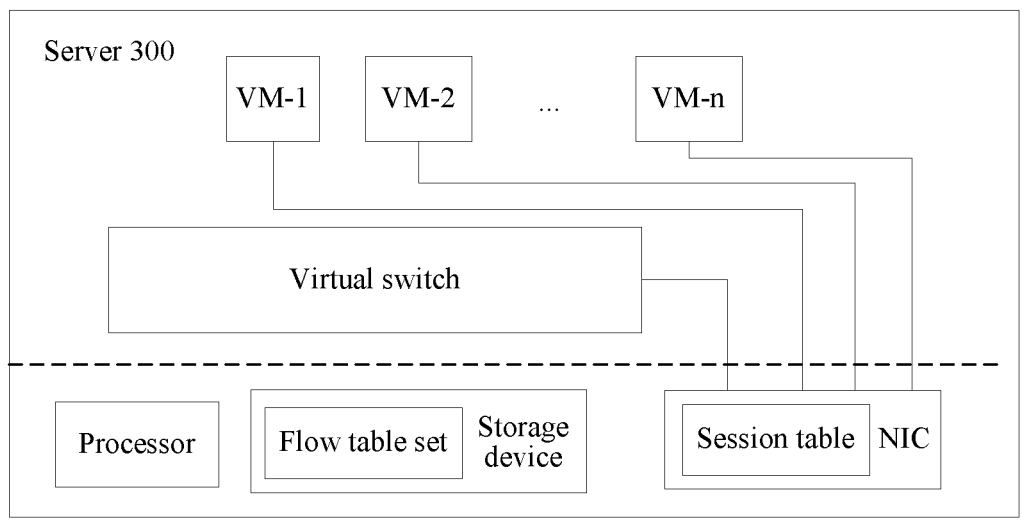
FIG. 3 is a schematic diagram of an organizational structure of a server according to an embodiment of the present invention.

As shown in FIG. 3, in a data processing procedure provided in the embodiments of the present invention, after receiving a data packet from an external network, if it is determined that a destination VM of the data packet runs on the server 300, a network interface card in the server 300 searches a session table for a session entry that matches the data packet; and processes the data packet according to an indication of the session entry that matches the data packet, and then sends the processed data packet to the destination VM connected to the network interface card.

Action fields of a session entry derive from a combination of action fields of a plurality of flow entries that match the data packet. If the network interface card finds no session entry that matches the received data packet, the network interface card sends the data packet to a virtual switch. The virtual switch queries the plurality of flow entries that match the data packet, processes the data packet according to the plurality of found flow entries, and sends, to the network interface card, processing information generated according to the flow entries that match the data packet.

If the virtual switch finds no flow entry that matches the data packet, the virtual switch sends a request to an SDN controller to obtain flow entries corresponding to the data packet; processes the data packet according to the plurality of flow entries obtained from the SDN controller; and sends, to the network interface card, processing information generated according to the obtained flow entries.

The network interface card generates, for subsequent use according to the processing information, an action field of a session entry that matches matching information of the data packet.

It can be learned from the foregoing data packet processing procedure that, in the data processing procedure provided in this application, a part of running pressure during the data packet processing is transferred to the network interface card. As a hardware device, the network interface card not only has high processing efficiency, but also does not need to occupy other resources at a hardware layer during running. In addition, in this application, the processing information of data performed by the virtual switch according to the plurality of flow entries is recorded in one session entry, so that a processing procedure is simplified, and the network interface card can process a matched data packet with only one session entry.

It should be noted that, for example, all VMs on the server 300 in FIG. 3 may be connected to the network interface card. Actually, alternatively, only some VMs may be connected to the network interface card, and other VMs are connected to the virtual switch. Specifically, a VM configuration manner is not limited to a manner in which all VMs need to be connected to the network interface card.

Figure 4:
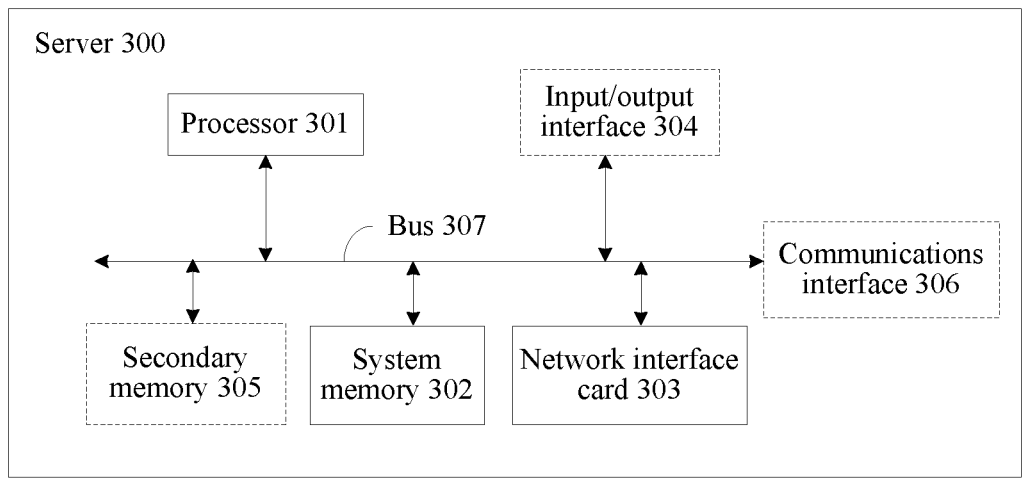
FIG. 4 is a schematic structural diagram of hardware of a server according to an embodiment of the present invention.

FIG. 4 is a schematic structural diagram of hardware of a server 300 according to an embodiment of the present invention. A virtual machine and a virtual switch run on the server 300.

As shown in FIG. 4, the server 300 includes a processor 301, and the processor 301 is connected to a system memory 302. The processor 301 may be a central processing unit (CPU), a graphics processing unit (GPU), a digital signal processor (DSP), or an integrated circuit in another form.

The server 300 further includes a network interface card 303. The network interface card 303 is configured to implement communication between the virtual machine on the server 300 and an external network.

A bus 307 is configured to transmit information between components of the server 300. The bus 307 may use a wired connection manner or a wireless communication manner. This is not limited in this application. The bus 307 may be further connected to an input/output interface 304, a secondary storage 305, and a communications interface 306.

The input/output interface 304 is connected to an input/output device configured to receive input information and output an operation result. The input/output device may be a mouse, a keyboard, a display, a CD-ROM drive, or the like.

A storage medium of the secondary memory 305 may be a magnetic medium (such as a floppy disk, a hard disk, or a magnetic tape), an optical medium (such as an optical disc), a semiconductor medium (such as a solid state disk (SSD)), or the like.

The communications interface 306 uses, for example, but is not limited to, a transceiver apparatus such as a transceiver, to communicate with another device or a communications network. The communications interface 306 and the communications network may be interconnected in a wired or wireless manner. The communications network may be the Internet, an intranet (English: intranet), a local area network (LAN), a wide area network (WAN), a storage area network (SAN), or the like, or any combination of the foregoing networks.

Some features of this embodiment of the present invention may be implemented/supported by the processor 301 by executing software code in the system memory 302. The system memory 302 may include some software, for example, an operating system (such as Darwin, RTXC, Linux, UNIX, OS X, Windows, or an embedded operating system (such as VxWorks)), an application program, and a data processing module.

In a working state, the server runs at least one VM and the virtual switch. Program code used to implement a method on a host side in a data processing method provided in the embodiments of the present invention is stored in the system memory 302, and is executed by the processor 301. In a working state, the network interface card performs a method on a network interface card side in the data processing method provided in the embodiments of the present invention.

This application further provides a data processing method. The server in the foregoing SDN architecture performs the method at runtime. A schematic flowchart of the method is shown in FIG. 5.

Figure 5:
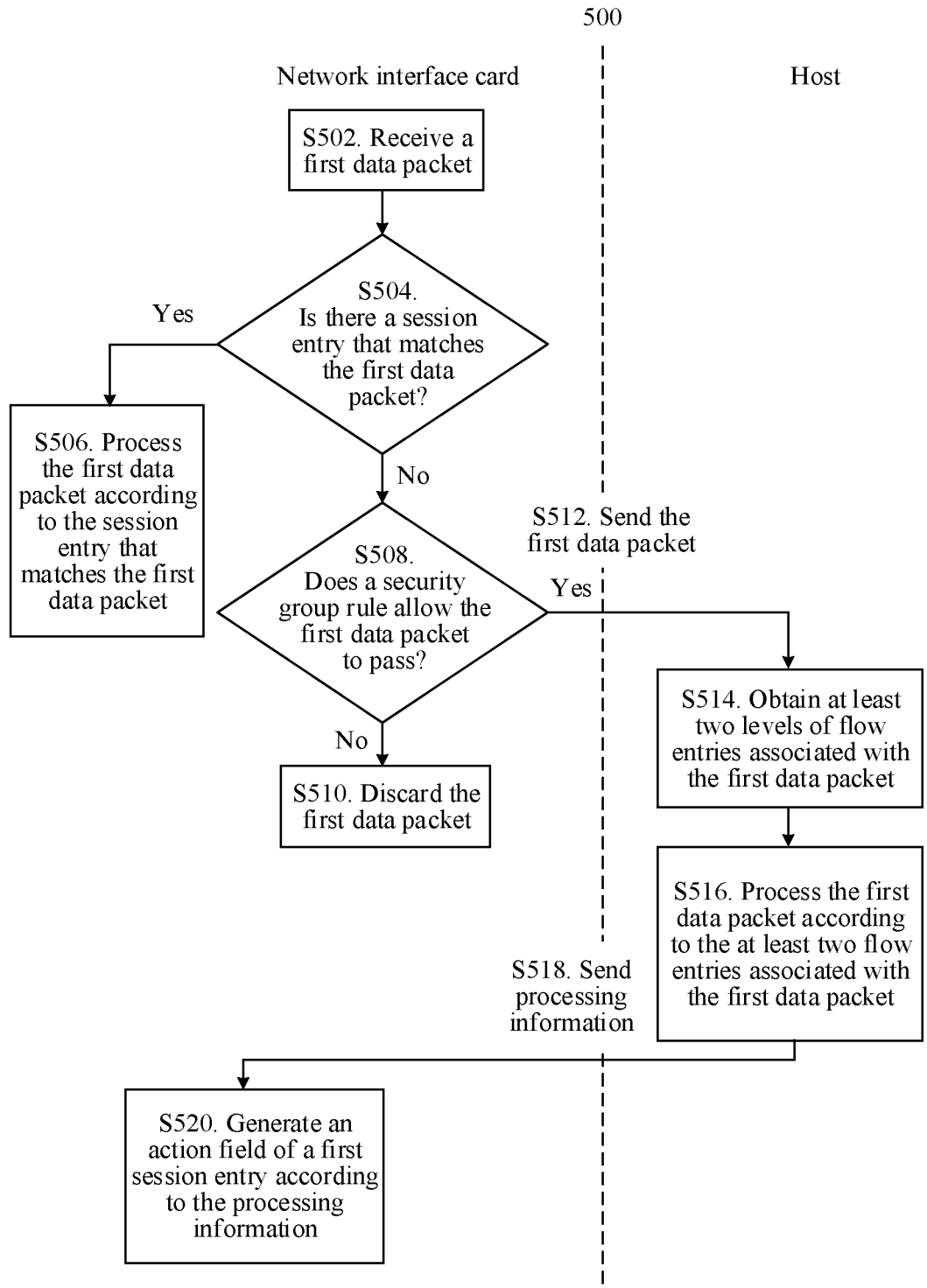
FIG. 5 is a schematic flowchart of a data packet processing method according to an embodiment of the present invention.

FIG. 5 is a flowchart of a data processing method 500 according to an embodiment of the present invention. The server 300 performs the method 500 at runtime. As shown in FIG. 5, the method 500 includes the following steps.

S502. A network interface card receives a first data packet.

The first data packet carries matching information and a payload of the first data packet. The first data packet may be a data packet sent by a virtual machine running on the server to an external network, or a data packet sent by the external network to the virtual machine running on the server.

Optionally, before step S502, the method 500 further includes: configuring a port for interconnecting a virtual machine and the network interface card. In this embodiment of the present invention, the network interface card and the virtual machine are interconnected by using a network interface card port. A network interface card port may be connected, by using an SR-I/OV technology, to a VM running on a host. The network interface card port may be a virtual function (VF) port defined in the SR-I/OV technology. In this embodiment of the present invention, alternatively, the network interface card and the virtual machine may be interconnected by using another technology. A technology for interconnecting the network interface card and the virtual machine is not limited in this embodiment of the present invention. Alternatively, the network interface card may be a network interface card that supports a virtual machine device queues (VMDq) function. The configuring, by the server, a port for interconnecting a virtual machine and the network interface card may include:

S5001. The host of the server establishes at least one virtual switch port on a virtual switch according to configuration information of the virtual switch port, where each virtual switch port is corresponding to one VM running on the host.

S5002. The host generates configuration information of a network interface card port, and sends the configuration information of the network interface card port to the network interface card of the server.

Specifically, the host obtains the configuration information of the virtual switch port, and sends the configuration information of the virtual switch port to a network interface card driver running on the host. The network interface card driver generates the configuration information of the network interface card port according to the configuration information of the virtual switch port, and sends the configuration information of the network interface card port to the network interface card. A function of the configuration information of the virtual switch port is similar to that of the configuration information of the network interface card port. The network interface card driver converts the configuration information of the virtual switch port into the configuration information of the network interface card port, mainly for complying with a specification in which the network interface card driver communicates with the network interface card.

S5003. The network interface card configures at least one network interface card port on the network interface card according to the configuration information of the network interface card port, where each network interface card port is connected to one VM running on the host.

The network interface card port may be specifically a virtual function (VF) port defined in the SR-I/OV technology.

Figure 6:
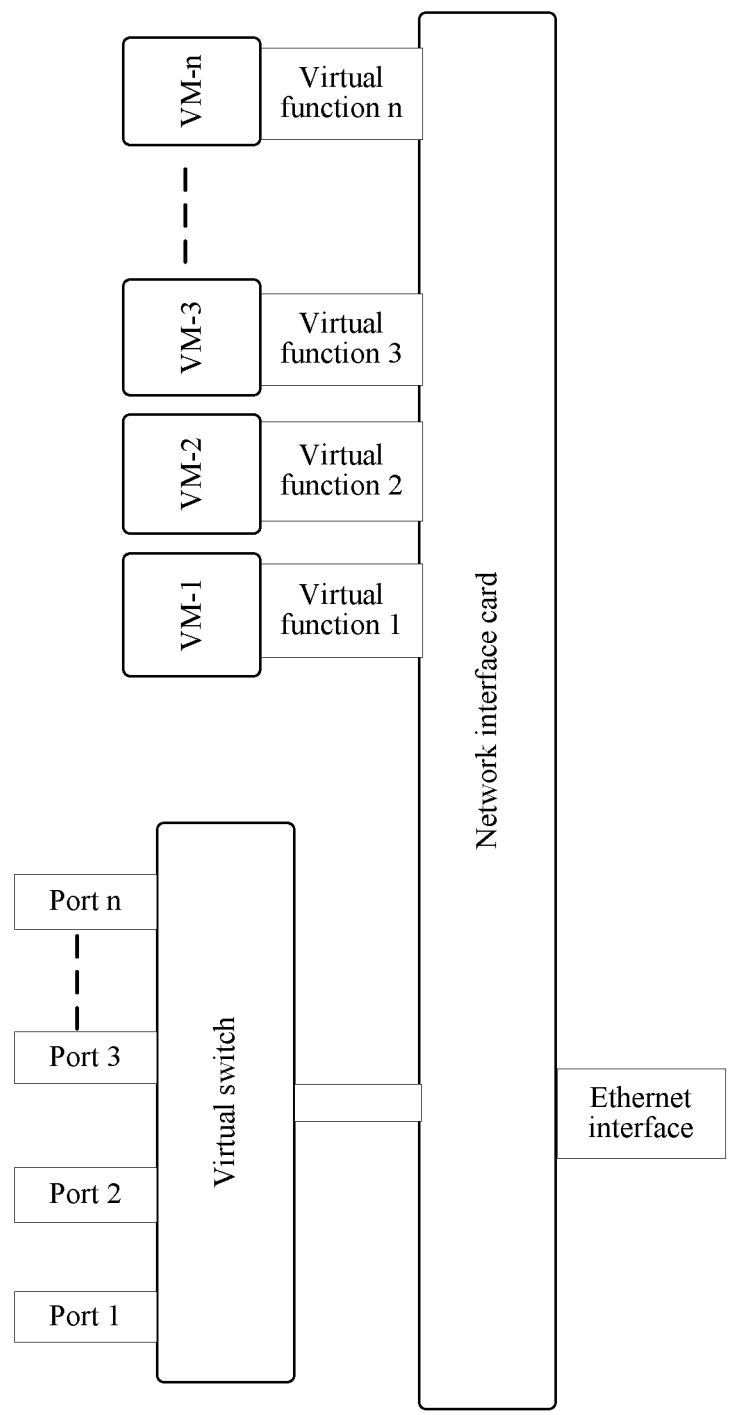
FIG. 6 is a schematic diagram of an organizational structure of a server according to an embodiment of the present invention.

A specific architectural diagram is shown in FIG. 6. Each port of the virtual switch is corresponding to one VF of the network interface card, and the network interface card and the virtual machine are interconnected by using the VF.

Steps S5001 to S5003 are optional steps, and steps S5001 to S5003 are a configuration process of the virtual switch and the network interface card. Steps S5001 to S5003 do not need to be performed each time before a subsequent step of steps S5001 to S5003 is performed. Through the configuration process, the VM running on the host is connected to the network interface card by using the network interface card port.

Because VS ports are in a one-to-one correspondence with VMs, and the VMs are in a one-to-one correspondence with network interface card ports, the VS ports are in a one-to-one correspondence with the network interface card ports. In a process of performing steps S5001 to S5003, the correspondence between the VS port and the network interface card port is stored into the virtual switch, and/or the correspondence between the VS port and the network interface card port is stored into the network interface card.

Optionally, the method 500 further includes: configuring at least one queue used by the virtual switch to communicate with the network interface card, where the queue is used by the virtual switch to return, to the network interface card, a data packet received from the network interface card. A queue configuration is in a plurality of forms. For example, the virtual switch communicates with the network interface card by using one queue, and the virtual switch sends, to the queue, all data packets that need to be sent to the network interface card. For another example, the virtual switch communicates with the network interface card by using n queues, where n is a quantity of VMs running on the host, and each queue is corresponding to one VM. A form of the queue configuration is not limited in this embodiment of the present invention.

S504. The network interface card checks, according to matching information of the first data packet, whether there is a session entry that matches the first data packet in a session table. If there is a session entry that matches the first data packet, step S506 is performed; or if there is no session entry that matches the first data packet, step S508 is performed.

A session entry includes a match field and an action field. The match field is used to match matching information of a data packet. Information recorded in the action field is used to instruct the network interface card to process a data packet that matches the session entry. The matching information of the data packet may include source information of the data packet and/or destination information of the data packet. The source information and the destination information may include an Internet Protocol (IP) address, a Media Access Control (MAC) address, a port number (for example, a Transmission Control Protocol (TCP) port or a User Datagram Protocol (UDP) port), or other similar information used to identify a source and a destination of the data packet.

Generally, an IP 5-tuple (source IP+source port+protocol type+destination IP+destination port) or an IP triplet (source IP+destination IP+protocol type) may be used to identify matching information of a data packet. The matching information may also include other feature items to which an IP packet belongs, for example, an ingress interface, a virtual local area network (VLAN), a tenant ID, or even a MAC address.

In an embodiment of the present invention, when a plurality of protocols concurrently exist in a system, addresses configured according to different types of protocols may be the same. For example, a VM 1 belongs to the IPV4 protocol, and a VM 2 belongs to the IPV6 protocol. In this case, the two VMs may have same IP addresses. In this case, protocol type information needs to be added to determine whether an IP address belongs to the VM 1 or the VM 2, that is, a specific protocol to be used to transmit a data packet. For example, a session may be identified by adding the IP (IPV4 or IPV6), the TCP, or the like.

In an implementation process of this embodiment of the present invention, when the network interface card is configured to perform only a switching function, MAC information may be used when a session table is constructed. When the network interface card is configured to perform a routing function, MAC information, IP information, and a layer 3 protocol type may be used when a session table is constructed. When the network interface card is configured to perform a higher layer network function (a firewall, network address translation (NAT), or the like), MAC, IP, a port, and a layer 3 or 4 protocol type may be used when a session table is constructed.

In this embodiment of the present invention, information recorded in the match field of the session entry may be some or all fields of the matching information carried in the data packet that matches the session entry. Alternatively, information recorded in the match field of the session entry may be information obtained after processing is performed according to some or all fields of the matching information carried in the data packet. For example, the information recorded in the match field of the session entry may be a hash operation result of the matching information carried in the data packet that matches the session entry. A correspondence between the match field of the session entry and the matching information carried in the data packet is not limited in this embodiment of the present invention.

After receiving the data packet, the network interface card queries the session table according to the matching information carried in the data packet. Specifically, the network interface card may query the session entry according to the field carried in the matching information, or query the session entry according to a result (for example, a hash operation) obtained after performing processing according to the field carried in the matching information.

If the matching information of the first data packet cannot match any session entry in a session table, the first data packet is a first data packet of a data flow in which the first data packet is located; or the first data packet is not a first data packet of the data flow, but a session entry corresponding to the data flow is deleted from the session table.

S506. The network interface card processes the first data packet according to the session entry that matches the first data packet.

More specifically, the network interface card processes the first data packet according to information recorded in an action field of the session entry that matches the first data packet.

If the session entry that matches the first data packet exists in the session table, after receiving the data packet, the network interface card may directly process the data packet according to the action field of the session entry, and does not need to report the data packet to the virtual switch for processing, so that a data processing procedure is simplified, and the virtual switch occupies fewer hardware resources on the server.

S508. The network interface card queries whether a security group rule allows the first data packet to pass. If the security group rule allows the first data packet to pass, perform step S512; or if the security group rule does not allow the first data packet to pass, perform step S510.

Before S508, the method 500 may further include: creating, by the network interface card, a first session entry that matches the first data packet, and creating, according to the matching information of the first data packet, a match field of the first session entry that matches the first data packet. The network interface card may write some or all fields of the matching information of the first data packet into the match field of the first session entry; or the network interface card may write a processing result of some or all fields of the matching information of the first data packet into the match field of the first session entry. A form of the match field of the first session entry is not limited in this embodiment of the present invention. Information about an action field of the first session entry may be first null or be reporting to the virtual switch.

In a specific implementation process, the security group rule may be established inside a network interface card chip or on the host of the server. If the security group rule is established on the host, after searching for a security group rule that matches the first data packet, the host sends, to the network interface card, the security group rule that matches the first data packet. The security group rule is used to implement a security filtering rule, so as to implement access isolation between hosts or VMs.

S510. The network interface card discards the first data packet.

If the security group rule does not allow the first data packet to pass, the network interface card discards the first data packet. The method 500 may further include: deleting the created first session entry, or setting an aging time of the first session entry to a relatively short time, so as to quickly age the first session table.

S512. The network interface card sends the first data packet to a host.

Specifically, the network interface card sends the first data packet to the virtual switch running on the host. When no session entry that matches the first data packet exists in the session table, and the security group rule allows the first data packet to pass, the network interface card sends the first data packet to the virtual switch running on the host for processing.

S514. The host obtains at least two flow entries associated with the first data packet.

Specifically, the virtual switch running on the host may obtain the at least two flow entries associated with the first data packet.

In the OpenFlow protocol, a virtual switch has extremely flexible functions. Different processing operations on a data packet are recorded in different flow entries. Generally, the virtual switch maintains a plurality of flow entries associated with one data packet. In this embodiment of the present invention, a flow entry associated with a data packet is a flow entry that needs to be used in a process in which the virtual switch processes the data packet. In this embodiment of the present invention, in a process of transmitting a data packet from a source to a destination, the data packet may change. However, for ease of description, in this embodiment of the present invention, a term such as a first data packet or a second data packet is used to describe a whole life cycle of a data packet. For example, the virtual switch performs a modification operation on a data packet 1 according to an action field of a flow entry 1 to obtain a data packet 2. In this case, the data packet 2 is different from the data packet 1. In the description of this embodiment of the present invention, both the data packet 1 and the data packet 2 are still referred to as a first data packet or a second data packet.

If no flow entry that matches the first data packet exists, the first data packet is a first data packet of a data flow in which the first data packet is located, or the first data packet is not a first data packet of the data flow, but a flow entry corresponding to the data flow is deleted. In this case, after obtaining the first data packet, the virtual switch may send the first data packet or the matching information of the first data packet to an SDN controller, and receive a flow entry that is corresponding to the data flow and that is generated by the SDN controller according to the first data packet.

S516. The host processes the first data packet according to the at least two obtained flow entries associated with the first data packet.

More specifically, the virtual switch running on the host may process the first data packet according to the at least two obtained flow entries associated with the first data packet. After processing the first data packet according to the at least two flow entries associated with the first data packet, the virtual switch forwards the processed data packet and a processing result to the network interface card, and the network interface card forwards the processed data packet and the processing result.

S518. The host sends processing information to the network interface card.

More specifically, the virtual switch running on the host may send the processing information to the network interface card.

After obtaining the at least two flow entries associated with the first data packet, the host generates the processing information according to the at least two flow entries. The processing information is used to indicate a processing operation performed by the virtual switch on the first data packet according to the at least two flow entries. In this embodiment of the present invention, if information recorded in action fields of the at least two flow entries is performing a processing operation on the first data packet, the processing information may be the information recorded in the action fields of the at least two flow entries. If information recorded in an action field of a first flow entry in the at least two flow entries is not processing the first data packet, for example, the information recorded in the action field of the first flow entry is searching for a next-level flow table, the processing information may not carry the information recorded in the action field of the first flow entry. In specific implementation, the processing information may include the information recorded in the action fields of the at least two flow entries, or may be information obtained after the information recorded in the action fields of the at least two flow entries is combined.

S520. The network interface card generates an action field of a first session entry according to the processing information sent by the host.

The first session entry includes a match field and the action field, where the match field is used to match the matching information of the first data packet. The first session entry is used to instruct the network interface card to process a data packet that matches the first session entry, that is, used to instruct the network interface card to process another data packet of the data flow in which the first data packet is located.

After step S520, if the network interface card receives a second data packet, where the second data packet and the first data packet belong to the same data flow, that is, the second data packet carries same matching information as the first data packet, the network interface card queries, according to the matching information carried in the second data packet, the first session entry that matches the second data packet, and processes the second data packet according to the first session entry. More specifically, the network interface card processes the second data packet according to the action field of the first session entry.

Optionally, the method 500 further includes: writing, by the network interface card into the action field of the first session entry, the security group rule that matches the first data packet. The network interface card may perform a plurality of processing operations on a matched data packet according to the first session entry, so that a data packet processing procedure is simplified. If a security group module modifies the security group rule of the first data packet, the security group module may further send a modification instruction to the network interface card, where the instruction is used to indicate modification performed by the security group module on the security group rule of the first data packet. The network interface card modifies a record of the security group rule in the action field of the first session entry according to the modification instruction.

The method 500 may further include: when the security group rule is used to implement a stateful firewall function, and a processing result of the firewall function is that both a forward data packet and a reverse data packet that are between a source and a destination of the first data packet are allowed to pass, the network interface card creates a second session entry according to the matching information of the first data packet, and generates a match field of the second session entry according to the matching information of the first data packet. The second session entry is a session entry that matches a reverse data flow of the first data packet, and indicates that a security action of a packet initiated from a destination address of the first data packet to a source address of the first data packet is also passing.

The network interface card may obtain, according to the matching information of the first data packet, matching information of the reverse data packet from the destination of the first data packet to the source of the first data packet. Source information and destination information of the reverse data flow of the first data packet are respectively destination information and source information of the first data packet. The match field of the second session entry may be configured according to a method similar to that is used to configure the first session entry. Details are not described herein again.

An action field of the second session entry may be set to uploading to the host or set to null. Subsequently, the action field of the second session entry is updated according to actual processing performed by the virtual switch on the reverse data packet. A specific solution procedure is similar to a procedure for configuring the action field of the first session entry in the foregoing description.

Alternatively, the first session entry and the second session entry may be combined into one record. The action field is classified into two fields: a forward field and a reverse field. For example, a direction in which a VM sends a data packet may be set to be a forward direction, and a direction in which a data packet is from a network side may be set to be a reverse direction. Source node information and destination node information are exchanged when a reverse table is queried.

Optionally, the method 500 further includes: after the virtual switch modifies any one of the at least two flow entries that match the matching information of the first data packet, sending, by the virtual switch, a modification instruction to the network interface card, where the modification instruction is used to indicate a modification operation performed by the virtual switch on the flow entry; and modifying, by the network interface card, the first session entry according to the modification instruction.

The server may link a session entry to a flow entry of the virtual switch according to a linked-list technology. When an entry of the virtual switch is deleted or modified, the host instructs the network interface card to synchronously delete or modify a session table.

In another implementation, a flow entry and a session entry each have an index ID. The host establishes a mapping relationship between a flow entry index ID and a session entry index ID. The host monitors a status of updating a flow table of the virtual switch, and notifies the network interface card when finding that a flow entry is updated. The network interface card updates a session entry according to an update operation on the flow entry.

A manner of updating the security group rule is similar to a manner of updating and managing flow entry information. Details are not described herein again.

Optionally, the method 500 further includes: when the first session entry is not accessed within a time period that exceeds a preset time threshold, deleting, by the network interface card, the first session entry, and sending a deletion instruction to the virtual switch; and deleting, by the virtual switch according to the deletion instruction, the at least two flow entries that match the matching information of the first data packet.

Because an OVS flow table has an aging mechanism, a flow entry that is not accessed for a long time is automatically aged. After the flow entry is aged, a session entry is deleted. In this case, a session entry needs to be continuously re-created and deleted. In this embodiment of the present invention, the host may set aging of the OVS flow table, may set an extremely long aging time or set the OVS flow table not to be aged. An aging mechanism may be set for a session entry. After the session entry is aged, an OVS may be instructed to age a flow entry corresponding to the session entry.

In this embodiment of the present invention, to prevent a TCP SYN (synchronous) attack (which is an attack in which link establishment requests are sent as many as possible), for a TCP link establishment request, the network interface card may recognize, from TCP requests, that the TCP link establishment request is a link establishment request, and first set an extremely short aging time (for example, less than 5 seconds) for such a request. If an entry is not accessed within a short time, the entry is aged and deleted; and this record is deleted as soon as possible, so as to prevent a session table from being attacked. The SYN attack takes advantage of defects in the TCP protocol, and a large quantity of half-open connection requests are sent to consume CPU resources and memory resources. A new session record is created in the session table once there is a new packet. If an old record is not deleted, all space is occupied, and consequently the new record cannot be created.

SYN is a handshake signal used when a connection is established in TCP/IP. When a normal TCP network connection is established between a client and a server, the client first sends an SYN message, the server uses an SYN+ACK acknowledgement to indicate that the message is received, and finally, the client responds with an ACK message. Only in this way, a reliable TCP connection can be established between the client and the server, and data can be transmitted between the client and the server. After a three-way handshake is completed in the TCP connection, and a connection establishment state enters a steady state, an aging time may be set to a long aging time (for example, 30 minutes).

For a UDP application, a short aging time is set when a session table is established for a unidirectional packet, and is changed to a long aging time when a response packet is received.

In addition, for a TCP link deletion request, the network interface card may delete a session entry once the network interface card finds that the request is a deletion request, so as to avoid space occupation.

Figure 7:
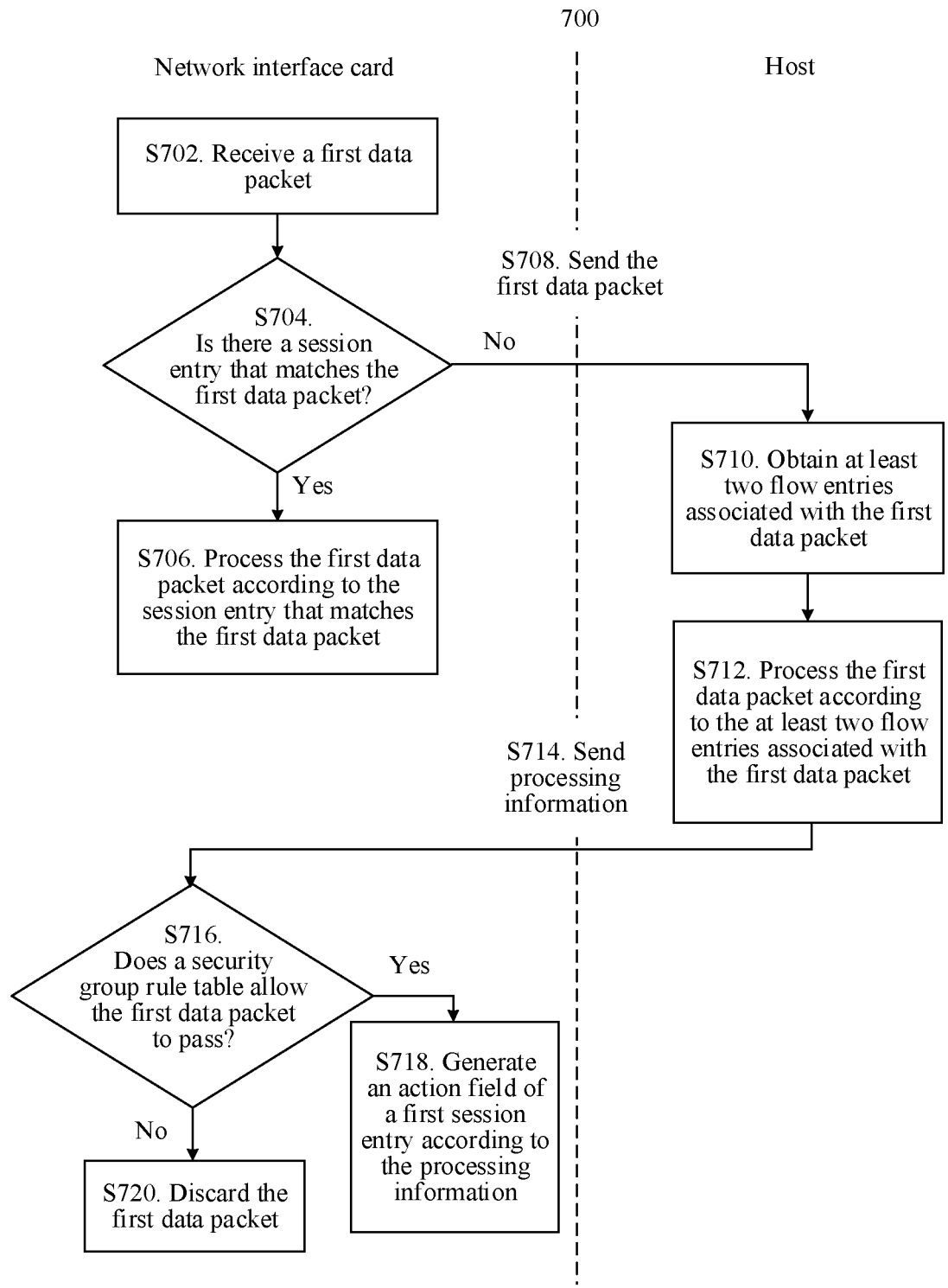
FIG. 7 is a schematic flowchart of a data packet processing method according to an embodiment of the present invention.

FIG. 7 is a flowchart of a data processing method 700 according to an embodiment of the present invention. The server 300 performs the method 700 at runtime. In the method 700, a network interface card needs to query a security group rule of a first data packet according to processing information from a virtual switch. As shown in FIG. 7, the method 700 includes the following steps.

S702. The network interface card receives a first data packet.

S704. The network interface card checks, according to matching information of the first data packet, whether there is a session entry that matches the first data packet in a session table. If there is a session entry that matches the first data packet, perform step S706; or if there is no session entry that matches the first data packet, perform step S708.

S706. The network interface card processes the first data packet according to the session entry that matches the first data packet.

For detailed descriptions of steps S702 to S706, refer to steps S502 to S506. Details are not described herein again.

S708. The network interface card sends the first data packet to a host.

Before S708, the method 700 may further include: creating, by the network interface card, a first session entry that matches the first data packet, and creating, according to the matching information of the first data packet, a match field of the first session entry that matches the first data packet. The network interface card may write some or all fields of the matching information of the first data packet into the match field of the first session entry. Alternatively, the network interface card may write a processing result of some or all fields of the matching information of the first data packet into the match field of the first session entry. A form of the match field of the first session entry is not limited in this embodiment of the present invention. An action field of the first session entry may be first null or be reporting to the virtual switch.

S710. The host obtains at least two flow entries associated with the first data packet.

S712. The host processes the first data packet according to the at least two obtained flow entries associated with the first data packet.

S714. The host sends processing information to the network interface card.

For detailed descriptions of steps S708 to S714, refer to steps S512 to S518. Details are not described herein again.

S716. The network interface card queries whether a security group rule allows the first data packet to pass. If the security group rule allows the first data packet to pass, perform step S718; or if the security group rule does not allow the first data packet to pass, perform step S720.

The network interface card queries the security group rule of the first data packet according to the processing information sent by the virtual switch. In a specific implementation process, the security group rule may be established inside a network interface card chip or on the host of the server.

S718. The network interface card generates an action field of a first session entry according to the processing information sent by the host.

For a detailed description of step S718, refer to step S520. Details are not described herein again.

S720. The network interface card discards the first data packet.

If the security group rule does not allow the first data packet to pass, the network interface card discards the first data packet.

If the security group rule does not allow the first data packet to pass, the method 700 may further include: deleting the created first session entry.

In the method 700, the network interface card needs to query processing information of the first data packet according to the processing information sent by the virtual switch. For a part of a detailed description of the method 700, refer to the method 500.

An example is used for description with reference to the architecture in FIG. 6. It is assumed that matching information of a data packet is an IP 5-tuple, an IP address of a VM-1 is 12.5.3.1, and the VM-1 is connected to a network interface card by using a VF1. When the VM-1 accesses, by using a port 2351, an external server whose IP address is 52.5.13.5, an access procedure of the VM-1 is as follows:

The VM-1 first initiates a TCP SYN packet, and the packet is directly sent to the network interface card by using the VF1 of the network interface card.

The network interface card searches for a session entry according to an IP 5-tuple 12.5.3.1:2351+TCP+52.5.13.5: 80. For a first data packet of a data flow, the network interface card finds no session entry.

The network interface card queries a security group table. It is assumed that a security group configuration rule allows 12.5.3.1 to access 52.5.13.5.

The network interface card sends the data packet to a host. A virtual switch queries at least two flow entries that match the data packet. A processing result according to the at least two flow entries is forwarding the data packet to an external port NET1.

The host sends processing information to the network interface card. The network interface card creates a forward session entry whose match field is 12.5.3.1:2351+TCP+52.5.13.5:80. An action field of the forward session entry is forwarding the data packet to the external port NET1.

If a security group rule allows both a forward data packet and a reverse data packet to pass, the network interface card may further create a reverse session entry whose match field is 52.5.13.5:80+TCP+12.5.3.1:2351. An action field of the reverse session entry is null (or is uploading to the host).

Alternatively, the forward session entry and the reverse session entry may be one entry. The action field is classified into a forward action field and a reverse action field. The forward action field is forwarding the data packet to the external network interface. The reverse action field is null. When reverse search is performed, an IP address and a port number of a source and an IP address and a port number of a destination are exchanged.

To further improve security and attack prevention, a TCP status is traced, a session table records an SYN status and a sequence number (each TCP request has a sequence number), and an aging time is a short aging time, for example, 3 seconds. In addition, a session entry is linked to a flow entry hit by an OVS and a security group entry hit by a security group, and aging of the flow entry of the OVS is limited (setting the flow entry of the OVS not to be aged or setting a relatively long aging time). Specifically, a mapping relationship between the session entry and the flow entry may be established in the OVS, and a mapping relationship between the session entry and the security group entry may be established in the security group.

The host re-sends the data packet to the network interface card, and the network interface card sends the data packet out by using the network port NET1.

The external server responds with an SYN+ACK packet. After the data packet enters the network interface card, the network interface card queries the session table, and hits the reverse session entry, but the action field is null. The network interface card sends the data packet to the OVS for forwarding processing. The OVS queries a flow entry to determine that the data packet needs to be forwarded to a port 1. Then, a network interface card driver queries a mapping relationship between a port and a VF to learn that the port 1 is corresponding to the VF1. In this case, a forwarding result is forwarding the data packet to the VF1, and the host sends processing information to the network interface card. The processing information indicates that the forwarding result is forwarding the data packet to the VF1, and the network interface card updates the action field of the reverse session entry according to the processing information, and sends the packet to the VM-1 by using the VF1.

After receiving the packet, the VM-1 returns an ACK packet with a TCP sequence number. Then, the network interface card determines an SYN status and a sequence number of a session entry; and if the sequence numbers match, enters an establishment state, and modifies an aging time of the session entry to a long aging time, for example, 30 minutes. For a subsequent TCP data packet, a forwarding result can be directly obtained by querying the session table, and the subsequent TCP data packet no longer needs to be sent to the host for forwarding by the OVS. If a flow entry or a security group rule corresponding to the session entry is modified or deleted, the session entry is modified or deleted according to an associated index relationship. If the VM-1 or the external server initiates a TCP close operation, after TCP end state processing is completed, the network interface card deletes the forward and reverse entries of the session table 12.5.3.1:2351+TCP+52.5.13.5:80, instructs the OVS and the security group to separately delete the mapping relationship between the session entry and the flow entry and the mapping relationship between the session entry and the security group entry, and re-allows the flow entry of the OVS to be aged.

In an implementation process, alternatively, after receiving the data packet, if the network interface card finds no corresponding session entry, the network interface card may first report the data packet to the OVS, and then search for a security group rule according to processing information sent by the OVS. For example, if a processing result is forwarding the data packet to the VF1, the network interface card queries a security group rule configured for the VF1; and if the network interface card finds that the data packet is prohibited from passing, discards the packet and deletes the created session entry. If a security group check does not need to be performed for a VM interface, a security group table may be first queried. If the data packet is prohibited from passing, the data packet is directly discarded, and is no longer sent to the host for forwarding by the OVS.

Figure 8:
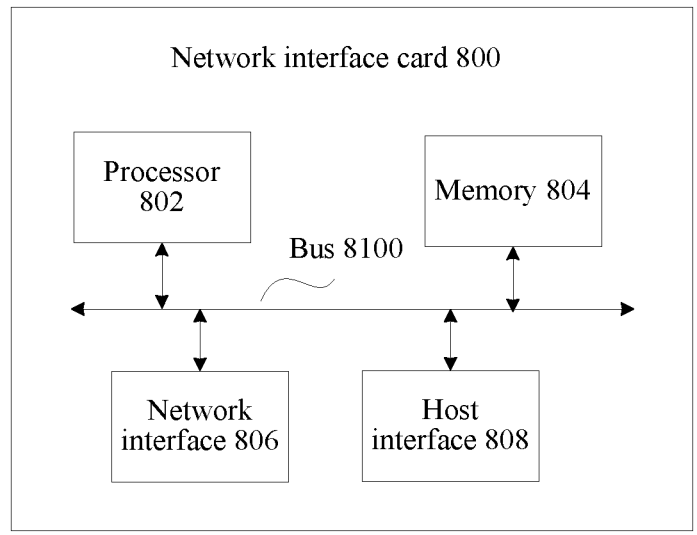
FIG. 8 is a schematic diagram of a logical structure of a network interface card according to an embodiment of the present invention.

FIG. 8 is a schematic structural diagram of hardware of a network interface card 800 according to an embodiment of the present invention. As shown in FIG. 8, the network interface card 800 includes a processor 802, a memory 804, a network interface 806, a host interface 808, and a bus 8100.

The host interface 808 is configured to connect to a host.

The processor 802 is configured to: send a first data packet to the host by using the host interface 808; receive processing information from the host by using the host interface 808, where the processing information is used to indicate a processing operation performed by the host on the first data packet according to at least two flow entries that match the first data packet; generate an action field of a first session entry according to the processing information; and generate a match field of the first session entry according to matching information of the first data packet, where the first session entry is used to record a rule used by the network interface card to process a data packet that matches the first session entry.

The processor 802 in this embodiment of the present invention may be processing logic in any form. For example, the processor 802 may be a central processing unit, a graphics processing unit, a digital signal processor DSP), or an integrated circuit in another form.

A function of the processor 802 may be implemented by a hardware integrated circuit, or may be implemented by the processor by executing code stored in the memory 804. This is not limited in the present invention.

The memory 804 is configured to store the first session entry.

The network interface card further includes the network interface 806. The network interface 806 is configured to connect to an external network. The processor 802 is further configured to receive a second data packet by using the host interface 808 or the network interface 806. The second data packet includes same matching information as the first data packet. The processor 802 is further configured to: query, according to the matching information, the first session entry that matches the second data packet; and process the second data packet according to the action field of the first session entry.

Before sending the first data packet to the host by using the host interface 808, the processor 802 is further configured to: receive the first data packet by using the host interface 808 or the network interface 806, query a recorded session entry according to the matching information, and send the first data packet to the host when finding no session entry that matches the first data packet.

Optionally, the processor 802 is further configured to: query a security group rule that matches the first data packet, and write the security group rule into the action field of the first session entry. If the security group rule includes a firewall rule that allows a forward data packet and a reverse data packet to pass, the processor 802 is further configured to: create a second session entry, and generate a match field of the second session entry according to the matching information of the first data packet. The second session entry is a session entry that matches a reverse data flow of the first data packet.

Optionally, the processor 802 is further configured to: receive a modification instruction from the host by using the host interface 808, and modify the first session entry according to the modification instruction. The modification instruction is used to indicate a modification operation performed by the host on one of the at least two flow entries.

Optionally, the processor 802 is further configured to delete the first session entry if the first session entry is not accessed within a time period that exceeds a preset time threshold. After deleting the first session entry, the processor 802 is further configured to send a deletion instruction to the host by using the host interface 808, where the deletion instruction is used to instruct the host to delete the at least two flow entries.

This embodiment of the present invention is an apparatus embodiment of the network interface card, and feature descriptions in other embodiments of the present invention are applicable to this embodiment of the present invention. Details are not described herein again.

Figure 9:
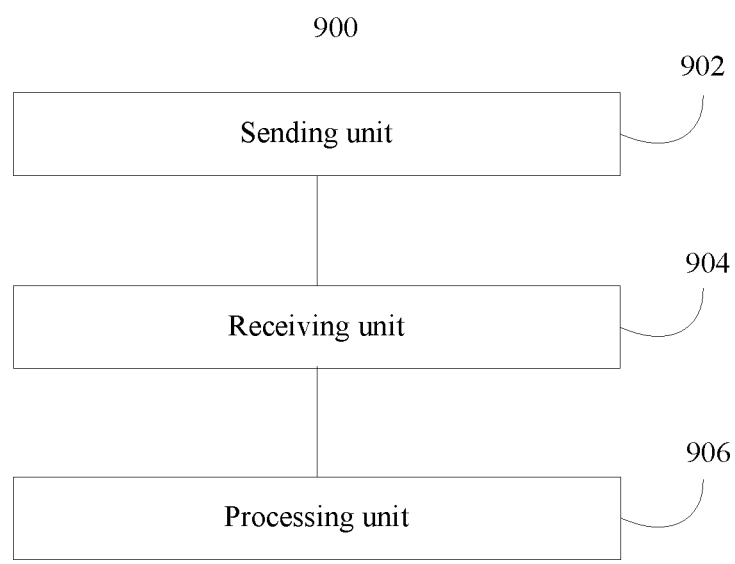
FIG. 9 is a schematic structural diagram of hardware of a network interface card according to an embodiment of the present invention.

FIG. 9 is a schematic diagram of a logical structure of a network interface card 900 according to an embodiment of the present invention. As shown in FIG. 9, the network interface card 900 includes a sending unit 902, a receiving unit 904, and a processing unit 906.

The sending unit 902 is configured to: send a first data packet to a host. The receiving unit 904 is configured to receive processing information from the host, where the processing information is used to indicate a processing operation performed by the host on the first data packet according to at least two flow entries that match the first data packet. The processing unit 906 is configured to: generate an action field of a first session entry according to the processing information, and generate a match field of the first session entry according to matching information of the first data packet, where the first session entry is used to record a rule used by the network interface card 900 to process a data packet that matches the first session entry.

The receiving unit 904 is further configured to receive a second data packet, where the second data packet includes same matching information as the first data packet. The processing unit 906 is further configured to: query, according to the matching information, the first session entry that matches the second data packet; and process the second data packet according to the action field of the first session entry.

Before the sending unit 902 sends the first data packet to the host, the receiving unit 904 is further configured to receive the first data packet. The processing unit 906 is further configured to query a recorded session entry according to the matching information. The sending unit 902 is further configured to send the first data packet to the host when the processing unit 906 finds no session entry that matches the first data packet.

Optionally, the processing unit 906 is further configured to: query a security group rule that matches the first data packet, and write the security group rule into the action field of the first session entry. If the security group rule includes a firewall rule that allows a forward data packet and a reverse data packet to pass, the processing unit 906 is further configured to: create a second session entry, and generate a match field of the second session entry according to the matching information of the first data packet, where the second session entry is a session entry that matches a reverse data flow of the first data packet.

Optionally, the receiving unit 904 is further configured to receive a modification instruction from the host, where the modification instruction is used to indicate a modification operation performed by the host on one of the at least two flow entries. The processing unit 906 is further configured to modify the first session entry according to the modification instruction.

Optionally, the processing unit 906 is further configured to delete the first session entry if the first session entry is not accessed within a time period that exceeds a preset time threshold. After deleting the first session entry, the processing unit 906 is further configured to send a deletion instruction to the host. The deletion instruction is used to instruct the host to delete the at least two flow entries.

This embodiment of the present invention is an apparatus embodiment of the network interface card, and feature descriptions in other embodiments of the present invention are applicable to this embodiment of the present invention. Details are not described herein again.

A function of the sending unit 902 and that of the receiving unit 904 in this embodiment of the present invention may be implemented by the processor 802 and the host interface 808 in the embodiment in FIG. 8, or implemented by the processor 802, the memory 804, and the host interface 808.

Alternatively, a part of the function of the sending unit 902 in this embodiment of the present invention may be implemented by the processor 802 and the network interface 806 in the embodiment in FIG. 8, or implemented by the processor 802, the memory 804, and the network interface 806.

A function of the processing unit 906 in this embodiment of the present invention may be implemented by the processor 802 in the embodiment in FIG. 8, or implemented by the processor 802 by executing the code in the memory 804.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions recorded in the foregoing embodiments or make replacements to some technical features thereof, without departing from the protection scope of the claims.

The invention claimed is:

1. A server for data processing, comprising:
a host; and
a network interface card having a host interface for connecting to the host,
wherein the host is configured to:
receive a first data packet sent by the network interface card, wherein the first data packet includes multiple matching parameters;
obtain multiple flow entries associated with the first data packet, wherein each of the multiple flow entries is maintained by a virtual switch operating on the host and comprises a match field including one matching parameter of the multiple matching parameters of the first data packet and an action field identifying an action to be applied to the first data packet corresponding to the matching field,
generate processing information indicating a processing operation performed by the host on the first data packet pursuant to the multiple flow entries, and
send the processing information to the network interface card;

wherein the network interface card is configured to:
create a first session entry in accordance with the processing information, the first session entry having an action field indicating the processing operation, and a match field including matching parameters of the matching fields of the multiple flow entries;
receive a second data packet, wherein the second data packet comprises matching parameters identical to the multiple matching parameters of the first data packet; and
obtain the first session entry based on a matching of the matching parameters of the second data packet with the matching field of the first session entry; and
process the second data packet according to the action field of the first session entry.

2. The server according to claim 1, wherein before the host receives the first data packet sent by the network interface card, the network interface card is further configured to:
receive the first data packet, wherein the first data packet is transmitting between a virtual machine running on the host and an external network via the network interface card;
search for a recorded session entry according to the multiple matching parameters, and
send the first data packet to the host when no recorded session entry that matches the first data packet is found.

3. The server according to claim 1, wherein the host is further configured to:
obtain a security group rule that matches the first data packet; and
send, to the network interface card, the security group rule that matches the first data packet;
wherein the network interface card is further configured to:
obtain the security group rule that matches the first data packet, and write the security group rule into the action field of the first session entry.

4. The server according to claim 3, wherein when the security group rule comprises a firewall rule that allows a forward data packet and a reverse data packet to pass, and the forward data packet is sent from a virtual machine running on the host to an external network via the network interface card;
wherein the network interface card is further configured to:
create a second session entry, and
generate a match field of the second session entry according to the multiple matching parameters of the first data packet, wherein the second session entry matches a reverse data flow of the first data packet.

5. The server according to claim 1, wherein the host is further configured to:
modify one of the multiple flow entries;
send a modification instruction to the network interface card, the modification instruction indicating a modification operation performed by the host on one of the multiple flow entries; and
wherein the network interface card is further configured to modify the first session entry according to the modification instruction.

6. A data processing method performed by a network interface card in a data center, comprising:
sending, a first data packet to a host of the data center, wherein the first data packet includes multiple matching parameters;

receiving processing information from the host, wherein the processing information indicates a processing operation performed by the host on the first data packet pursuant to multiple flow entries that match the matching parameters of the first data packet;
creating, a first session entry in accordance with the processing information, wherein the first session entry has
an action field indicating the processing operation; and
a match field including matching parameters of the matching fields of the multiple flow entries;
receiving a second data packet, wherein the second data packet comprises matching parameters identical to the matching parameters of the first data packet;
obtaining the first session entry that matches the succeeding data packet according to the matching information, and
processing the second data packet according to the action field of the first session entry.

7. The method according to claim 6, wherein before sending a first data packet to a host, the method further comprises:
receiving the first data packet, wherein the first data packet is transmitting between a virtual machine running on the host and an external network via the network interface card;
searching for a recorded session entry according to the multiple matching parameters; and
sending the first data packet to the host when no recorded session entry that matches the first data packet is found.

8. The method according to claim 6, wherein the method further comprises:
obtaining a security group rule that matches the first data packet; and
writing the security group rule into the action field of the first session entry.

9. The method according to claim 8, wherein when the security group rule comprises a firewall rule that allows a forward data packet and a reverse data packet to pass, and the forward data packet is sent from a VM running on the host to an external network via the network interface card;
wherein the method further comprises:
creating a second session entry; and
generating a match field of the second session entry according to the multiple matching parameters of the first data packet, wherein the second session entry matches a reverse data flow of the first data packet.

10. The method according to claim 6, wherein the method further comprises:
receiving a modification instruction from the host, wherein the modification instruction is used to indicate a modification operation performed by the host on one of the multiple flow entries; and
modifying the first session entry according to the modification instruction.

11. The method according to claim 6, wherein the method further comprises:
deleting the first session entry when the first session entry is not accessed within a preset time period;
sending a deletion instruction to the host, wherein the deletion instruction is used to instruct the host to delete the multiple flow entries.

12. A network interface card for data processing, comprising:
a host interface for connecting to a host of a server;
a processor, and
a memory storing executable instructions, wherein the processor is configured to execute the executable instructions to:

send a first data packet to the host by using the host interfaced, wherein the first data packet includes multiple matching parameters;

receive processing information from the host via the host interface, wherein the processing information indicates a processing operation performed by the host on the first data packet pursuant to multiple flow entries that match the matching parameters of the first data packet;

create a first session entry in accordance with the processing information, wherein the first session entry has an action field of indicating the processing operation, and, and a match field including matching parameters of the matching fields of the multiple flow entries; and store the first session entry into the memory;

receive a second data packet, wherein the second data packet comprises matching parameters identical to the multiple matching parameters of the first data packet; and obtain, from the memory, the first session entry based on a matching of the matching parameters of the second data packet and the matching field of the first session entry; and process the second data packet according to the action field of the first session entry.

13. The network interface card according to claim 12, wherein the network interface card further comprises a network interface configured to connect to an external network; and before sending the first data packet to the host by using the host interface, the processor is further configured to: receive the first data packet by using the host interface or the network interface, search a recorded session entry according to the multiple matching parameters, and send the first data packet to the host when finding no session entry that matches the first data packet.

14. The network interface card according to claim 12, wherein the processor is further configured to: obtain a security group rule that matches the first data packet, and write the security group rule into the action field of the first session entry.

15. The network interface card according to claim 14, wherein when the security group rule comprises a firewall rule that allows a forward data packet and a reverse data packet to pass, and the forward data packet is sent from a virtual machine running on the host to an external network via the network interface card;

wherein the processor is further configured to: create a second session entry, and generate a match field of the second session entry according to the multiple matching parameters of the first data packet, wherein the second session entry matches a reverse data flow of the first data packet.

* * * * *